(12) United States Patent
de Jager et al.

(10) Patent No.: US 7,810,011 B2
(45) Date of Patent: Oct. 5, 2010

(54) HARDWARE GENERATOR FOR UNIFORM AND GAUSSIAN DEVIATES EMPLOYING ANALOG AND DIGITAL CORRECTION CIRCUITS

(75) Inventors: Ocker Cornelis de Jager, Potchefstroom (ZA); Carolus Johannes Reinecke, Potchefstroom (ZA); Hendrik Johannes Stephanus Van der Walt, Potchefstroom (ZA); Barend Visser, Potchefstroom (ZA); Roelof Cornelius Botha, Potchefstroom (ZA)

(73) Assignee: North-West University (ZA)

( * ) Notice: Subject to any disclaimer, the term of this patent is extended or adjusted under 35 U.S.C. 154(b) by 959 days.

(21) Appl. No.: 10/569,292

(22) PCT Filed: Aug. 23, 2004

(86) PCT No.: PCT/IB2004/051533

§ 371 (c)(1),
(2), (4) Date: Oct. 11, 2006

(87) PCT Pub. No.: WO2005/020064

PCT Pub. Date: Mar. 3, 2005

(65) Prior Publication Data

US 2007/0162809 A1    Jul. 12, 2007

(30) Foreign Application Priority Data

Aug. 22, 2003    (ZA)    ................................. 2003/6559

(51) Int. Cl.
*H03M 13/00*    (2006.01)
(52) U.S. Cl. .................... 714/758; 714/761; 714/764
(58) Field of Classification Search ................ 714/758, 714/761, 754, 753, 764, 723, 799; 708/250, 708/255

See application file for complete search history.

(56) References Cited

U.S. PATENT DOCUMENTS 3,706,941 A    12/1972    Cohn (Continued)

FOREIGN PATENT DOCUMENTS

EP    0981081 A    5/2002

(Continued)

OTHER PUBLICATIONS

Random Numbers Produced Via a Technique Employing Both a White Noise Generator and the Data Encryption Algorithm. IBM, vol. 34, p. 316-318; Dec. 1, 1991.*

(Continued)

*Primary Examiner*—Fritz Alphonse
(74) *Attorney, Agent, or Firm*—Schwegman, Lundberg & Woessner, P.A.

(57) ABSTRACT

A hardware random number generator (RNG) has a source of entropy for providing a bit stream (DIS) comprising successive bits of a first state and a second state. The RNG includes a first digital corrector circuit configured to provide from two successive bits in the bit stream an output bit of an output bit stream according to a first scheme to ensure that bits in the output bit stream are independent from one another. A serially connected second digital corrector circuit ensures that the bits in the output bit stream are also unbiased, so that the output bit stream is truly random. A Gaussian generator connected to an output of either the first corrector or the second corrector generates from the output bit stream words having standard Gaussian deviates.

11 Claims, 9 Drawing Sheets

U.S. PATENT DOCUMENTS

Figure 1:
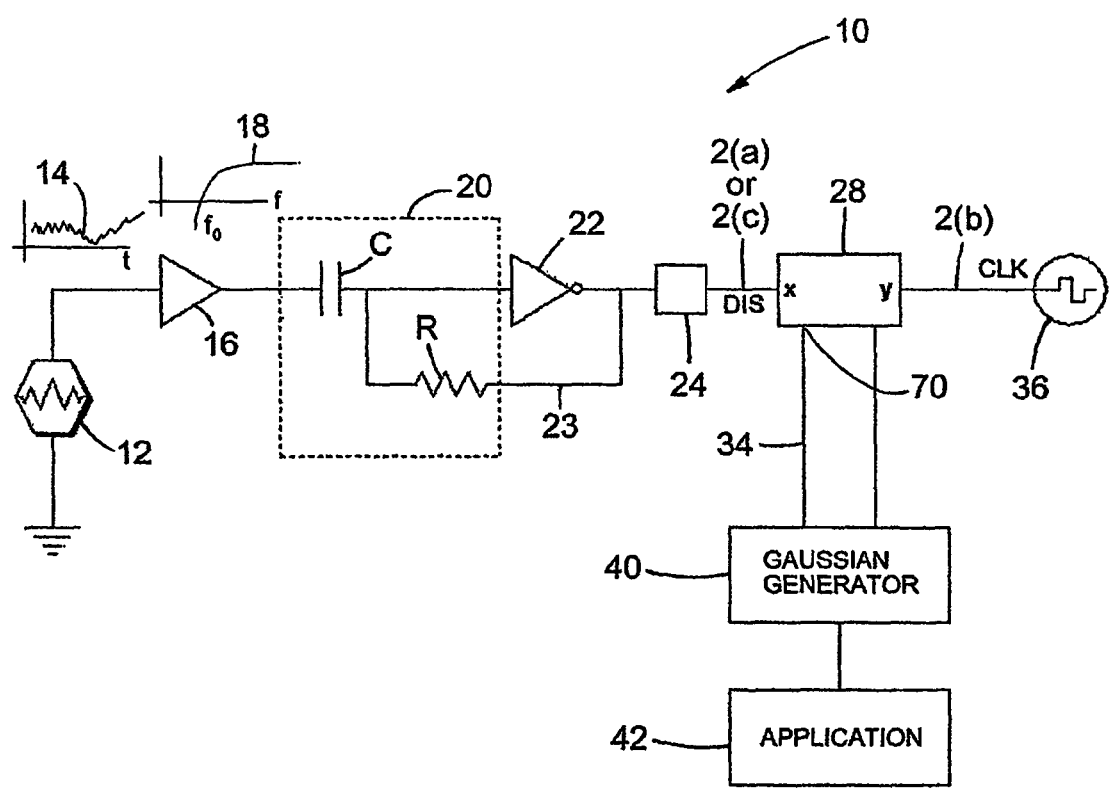

| | | | |
|---|---|---|---|
| 4,176,399 A | | 11/1979 | Hoffman et al. |
| 6,687,721 B1 * | | 2/2004 | Wells et al. ................. 708/250 |
| 6,792,438 B1 * | | 9/2004 | Wells et al. ................. 708/250 |
| 6,862,605 B2 * | | 3/2005 | Wilber ....................... 708/255 |

FOREIGN PATENT DOCUMENTS

| EP | 1241565 A | 9/2002 |
|---|---|---|
| WO | WO-0059153 | 10/2000 |

OTHER PUBLICATIONS

PCT Search Report (4 pgs.), Apr. 7, 2005, Pfab, S.

* cited by examiner

US 7,810,011 B2

HARDWARE GENERATOR FOR UNIFORM AND GAUSSIAN DEVIATES EMPLOYING ANALOG AND DIGITAL CORRECTION CIRCUITS

This application is a U.S. National Stage Filing under 35 U.S.C. 371 from International Patent Application No. PCT/IB2004/051533, filed on Aug, 23, 2004, which claims priority under 35 U.S.C. §119(a)-(d) or 365(b) from South African Application No. 2003/6559, filed Aug. 22, 2003, the entire content of each of the applications is incorporated herein by reference.

TECHNICAL FIELD

This invention relates to a random number generator (RNG) and more particularly a hardware RNG for generating at an output a train of successive truly random bits of first and second states and/or truly random numbers having a Gaussian distribution.

Both software and hardware random number generators are known in the art. The output signals of the known software generators are not truly random, but pseudo random and these generators are generally slower than hardware generators. Some known hardware RNG's comprise quantum mechanical optical devices, are expensive, bulky and difficult to implement The outputs of other hardware RNG's do not exhibit statistically truly random behaviour. In this specification the term "truly random" is used to denote a collection of elements wherein the elements are independent from one another and identically distributed.

OBJECT OF THE INVENTION

Accordingly it is an object of the present invention to provide a hardware random number generator and a method of generating random numbers with which the applicant believes the aforementioned disadvantages may at least be alleviated.

SUMMARY OF THE INVENTION

According to the invention there is provided a hardware random number generator (RNG), comprising:
  a source of entropy for providing an input bit stream comprising successive bits of a first state and a second state;
  a first digital corrector comprising a first input and a first output;
  the corrector being configured to provide at the first output from two successive bits in the input bit stream an output bit of a first output bit stream according to a first scheme wherein a first bit of a first state and a second bit of the first state yield an output bit of a third state and wherein a first bit of the first state and a second bit of a second state yield an output bit of a fourth state, wherein the third and fourth states are inverse to one another and wherein the third state is equal to one of the first state and the second state, thereby to ensure that successive bits in the output bit stream at the first output of the corrector are independent from one another.

The first output of the first corrector is preferably connected to a first input of a second digital corrector, the second digital corrector comprising a first output and being configured to provide at the first output from two successive bits at the first input of the second corrector an output bit of a second output bit stream according to a second scheme wherein a first bit of a first state and a second bit of a second state yield an output bit of a third state and wherein a first bit of the second state and a second bit of the first state yield an output bit of a fourth state, wherein the third and fourth states are inverse to one another and wherein the third state is equal to one of the first state and the second state, thereby to ensure that successive bits in the second output bit stream are both independent from one another and unbiased and hence truly random.

The source of entropy may comprise a white noise generating element having an output connected to an analogue high pass amplifier having an output and a cut off frequency of $f_0$.

The output of the high pass filter may be connected to an input of a voltage level discriminator circuit having an output.

The output of the level discriminator circuit may be connected to a first input of a flip-flop, to generate the input bit stream at an output thereof.

An analogue voltage level compensation circuit may be provided at an input of the voltage level discriminator circuit. The compensation circuit may comprise an RC circuit having an RC time constant which is shorter than $1/f_0$.

The RNG may comprise a Gaussian generator comprising an input connected to either the first output of the first digital corrector or the first output of the second digital corrector, the generator comprising an adder arrangement for generating a sum of j words of i sequential bits each received from the corrector; subtractor means for deriving a difference between the sum and a mean value of the sum; and a divider arrangement for dividing the difference by a standard deviation, thereby to generate at an output of the Gaussian generator a Gaussian deviate.

According to another aspect of the invention there is provided a method of generating a random bit stream comprising the steps of:
  utilizing a source of entropy for providing an input bit stream comprising successive bits of a first state and a second state;
  utilizing a first hardware digital corrector comprising a first input and a first output to provide at the first output from two successive bits in the input bit stream at the first input an output bit of a first output bit stream according to a first scheme wherein a first bit of a first state and a second bit of the first state yield an output bit of a third state and wherein a first bit of the first state and a second bit of a second state yield an output bit of a fourth state, wherein the third and fourth states are inverse to one another and wherein the third state is equal to one of the first state and the second state, thereby to ensure that successive bits in the output bit stream at the output of the corrector are independent from one another.

The method may include the further step of utilizing a second digital corrector comprising an input and an output in series with the first corrector and wherein the second digital corrector is used to provide at said output from two successive bits at said input of the second corrector an output bit of a second output bit stream according to a second scheme wherein a first bit of a first state and a second bit of a second state yield an output bit of a third state and wherein a first bit of the second state and a second bit of the first state yield an output bit of a fourth state, wherein the third and fourth states are inverse to one another and wherein the third state is equal to one of the first state and the second state, thereby to ensure that successive bits in the second output bit stream are both independent from one another and unbiased.

BRIEF DESCRIPTION OF THE ACCOMPANYING DIAGRAMS

Figure 2:
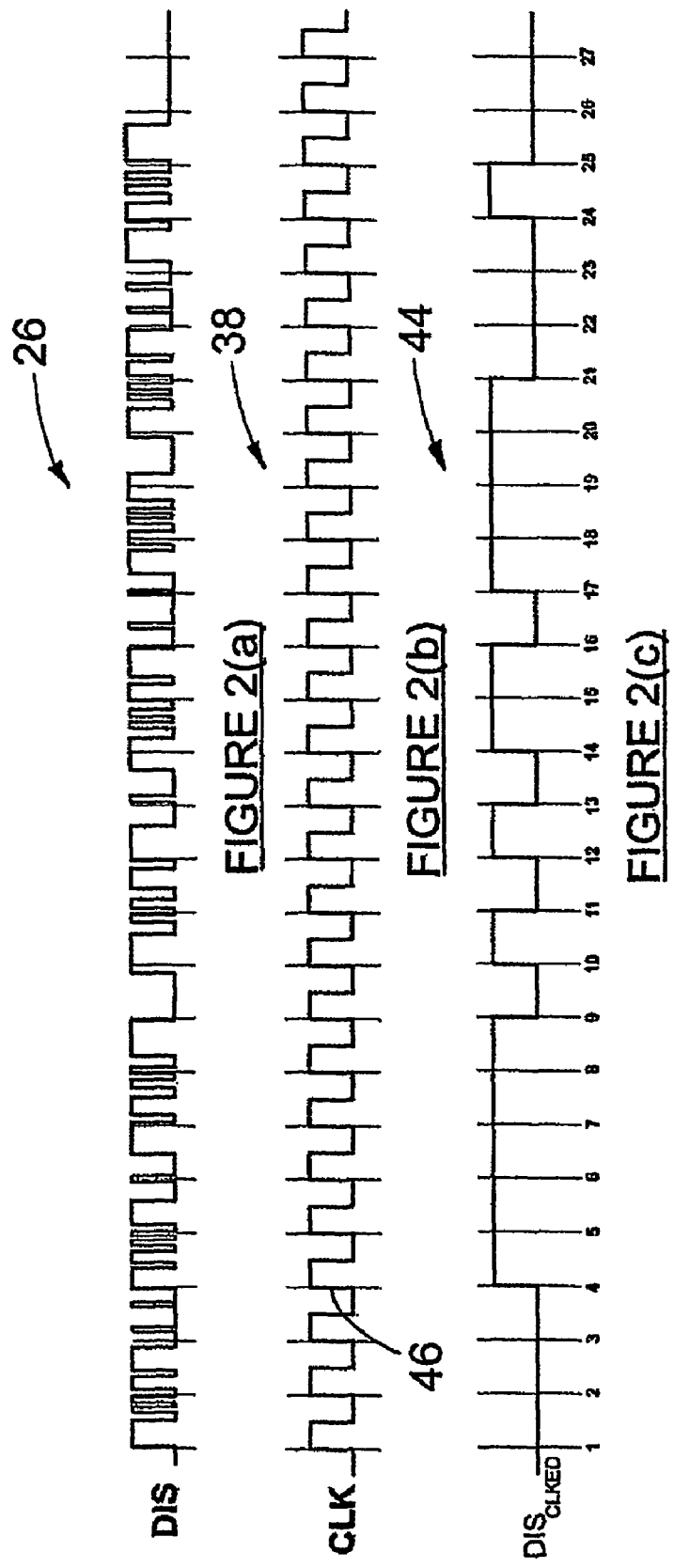
Figure 3:
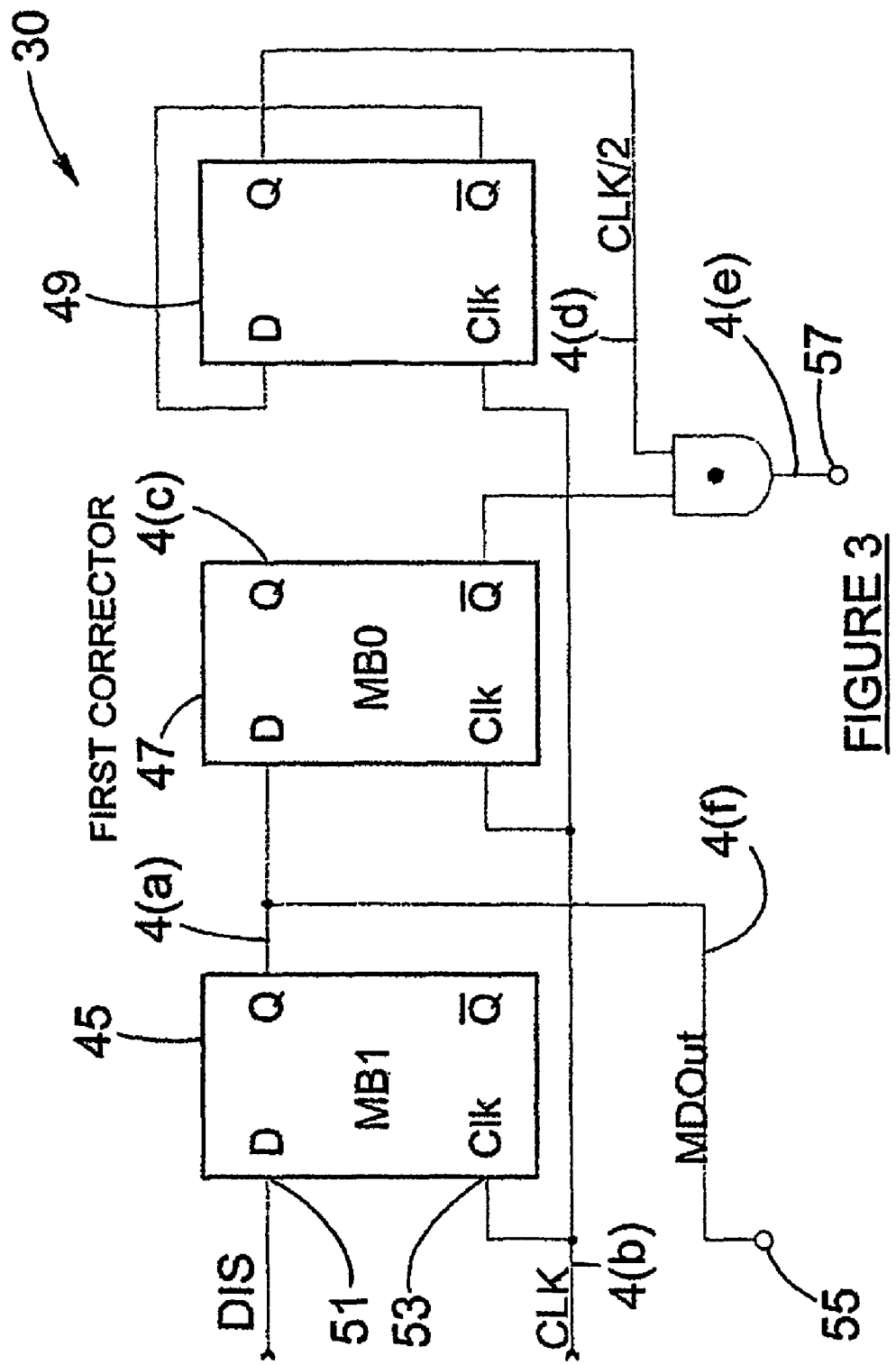
Figure 4:
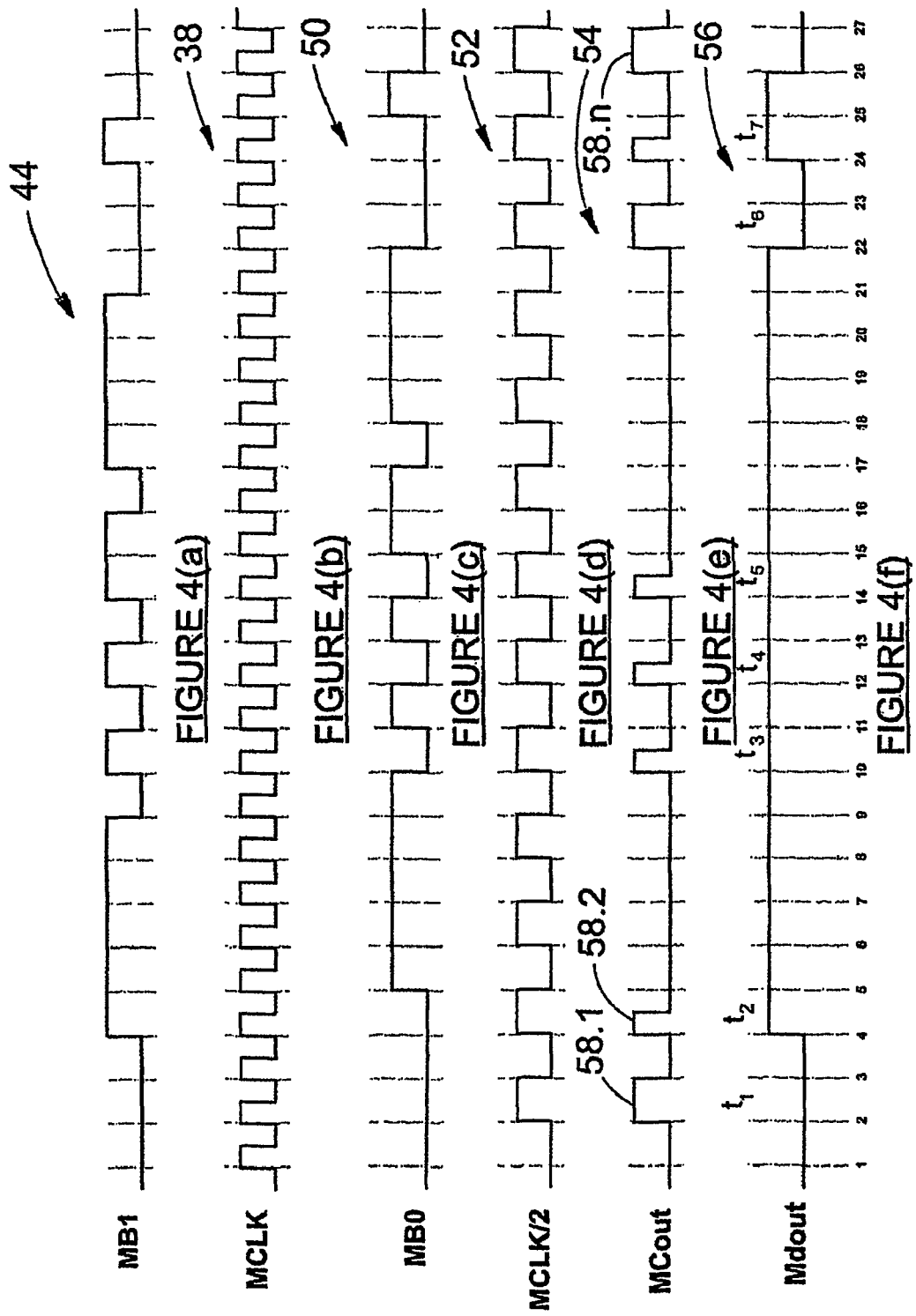
Figure 5:
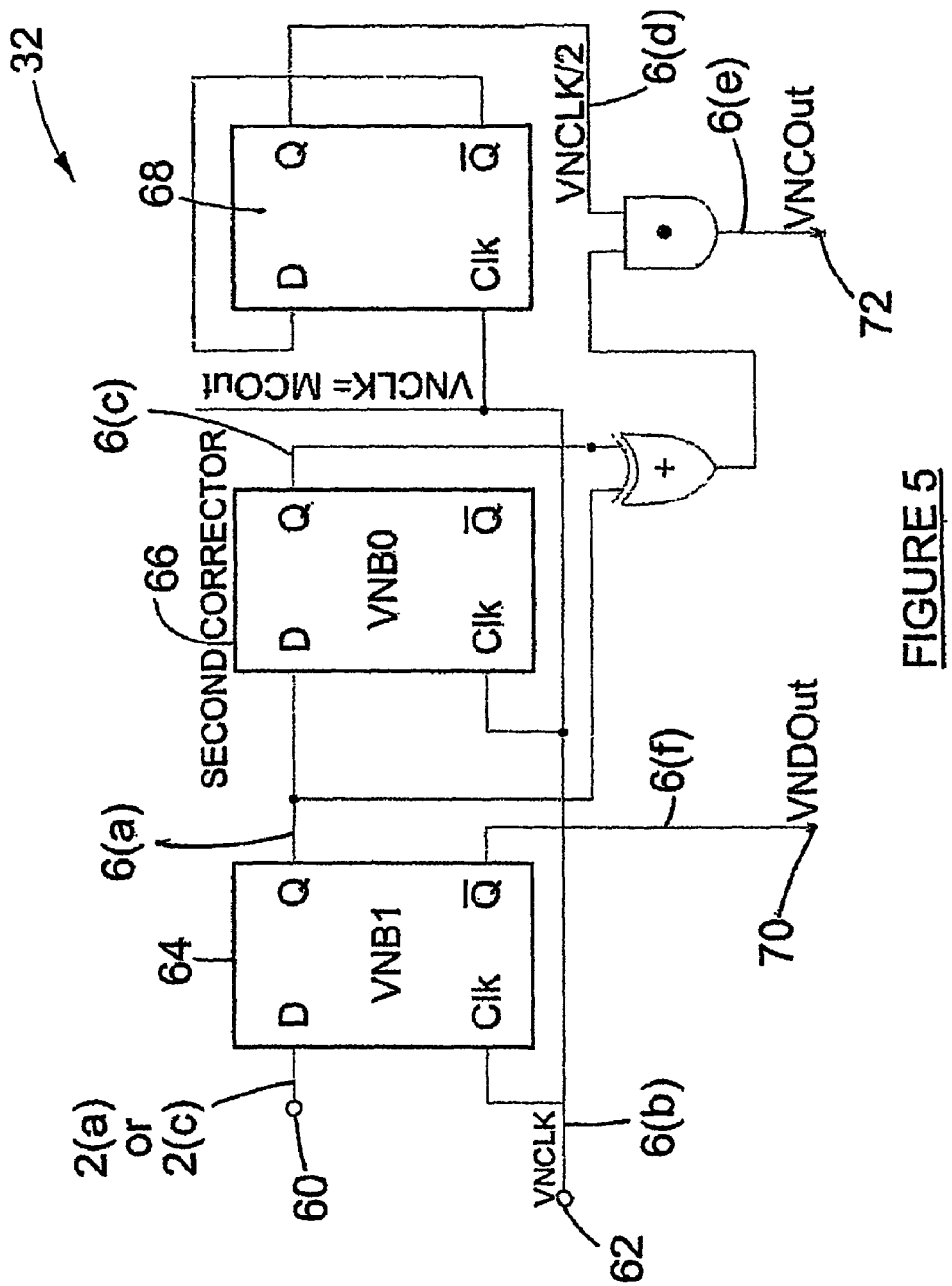
Figure 7:
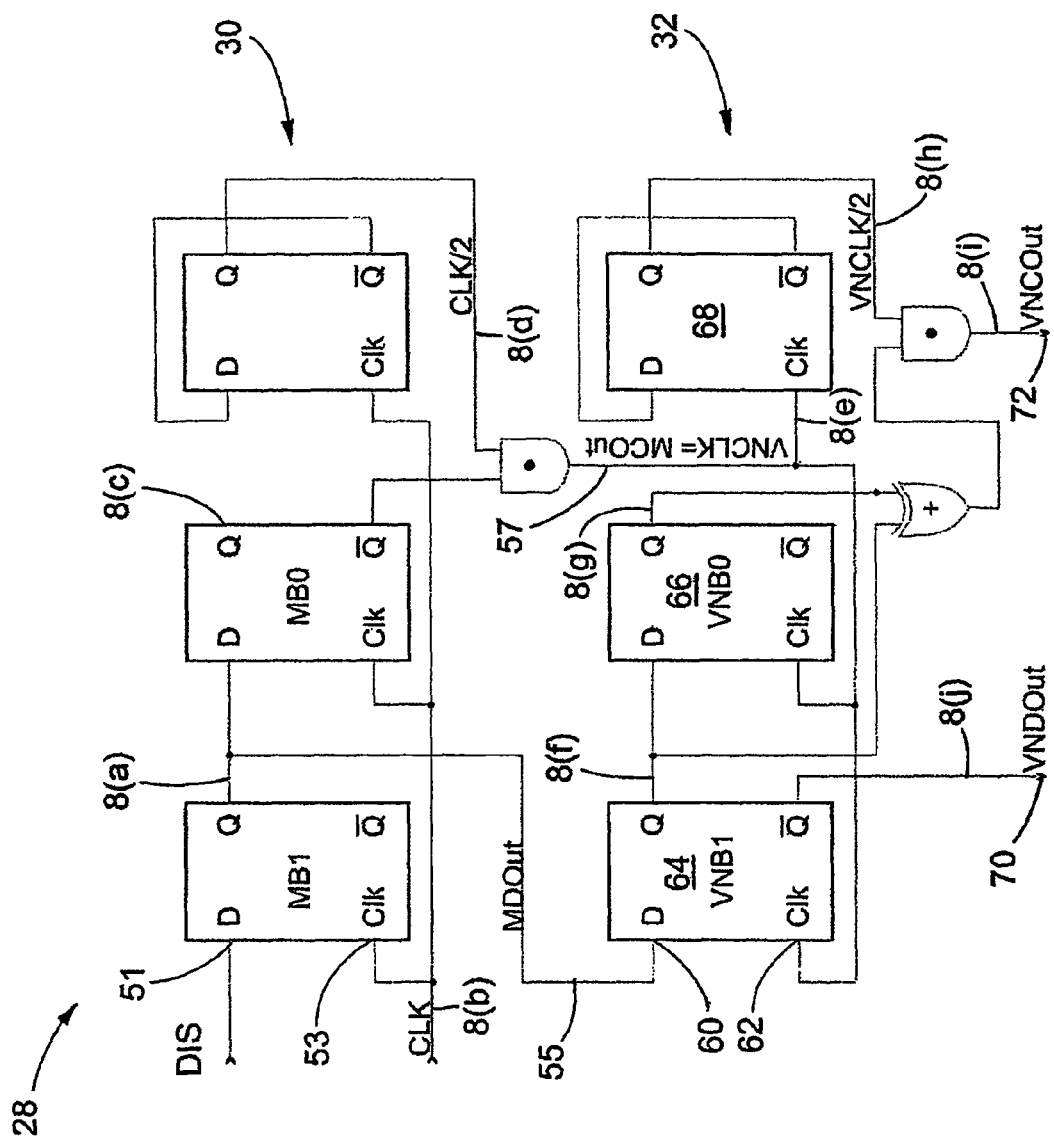
Figure 8:
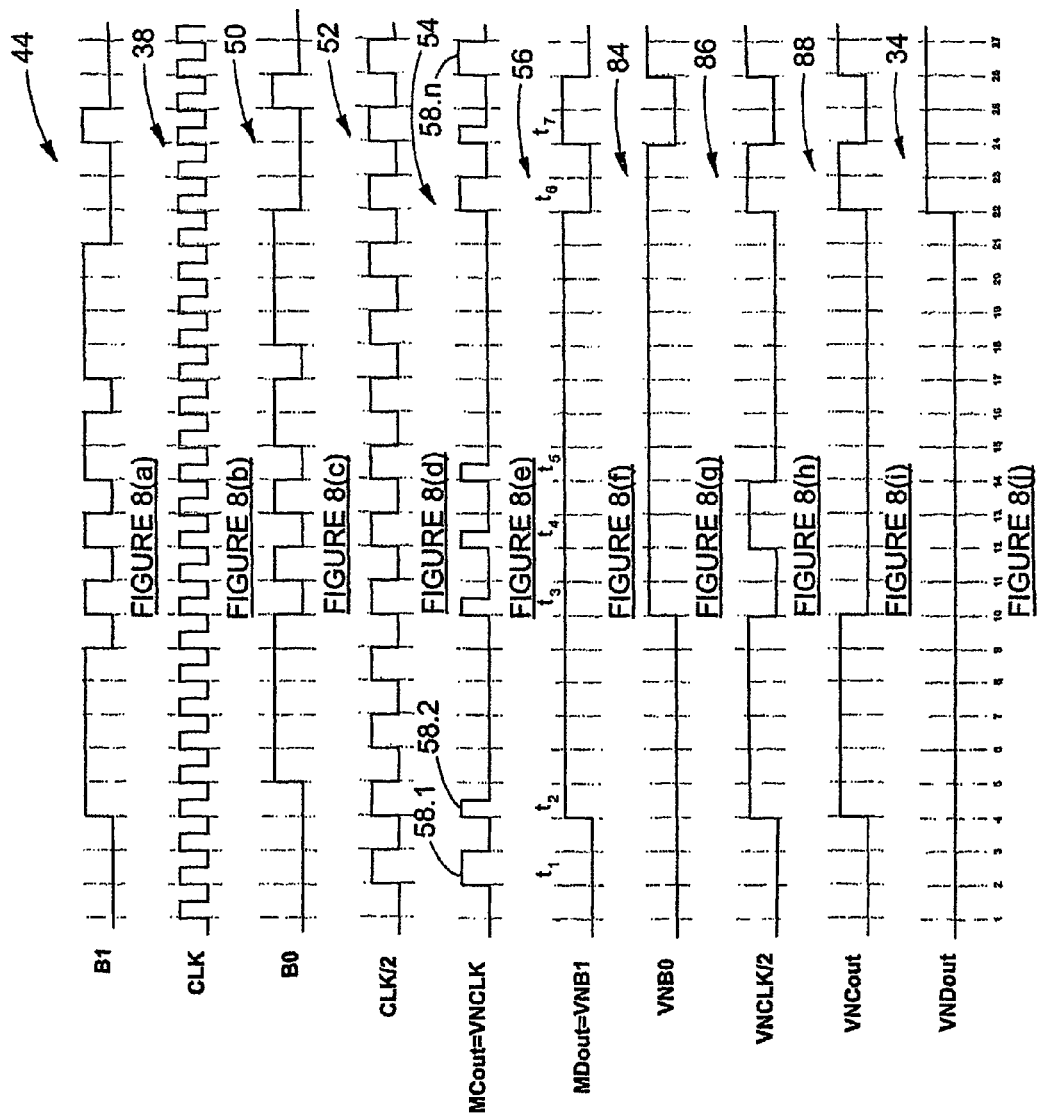
Figure 9:
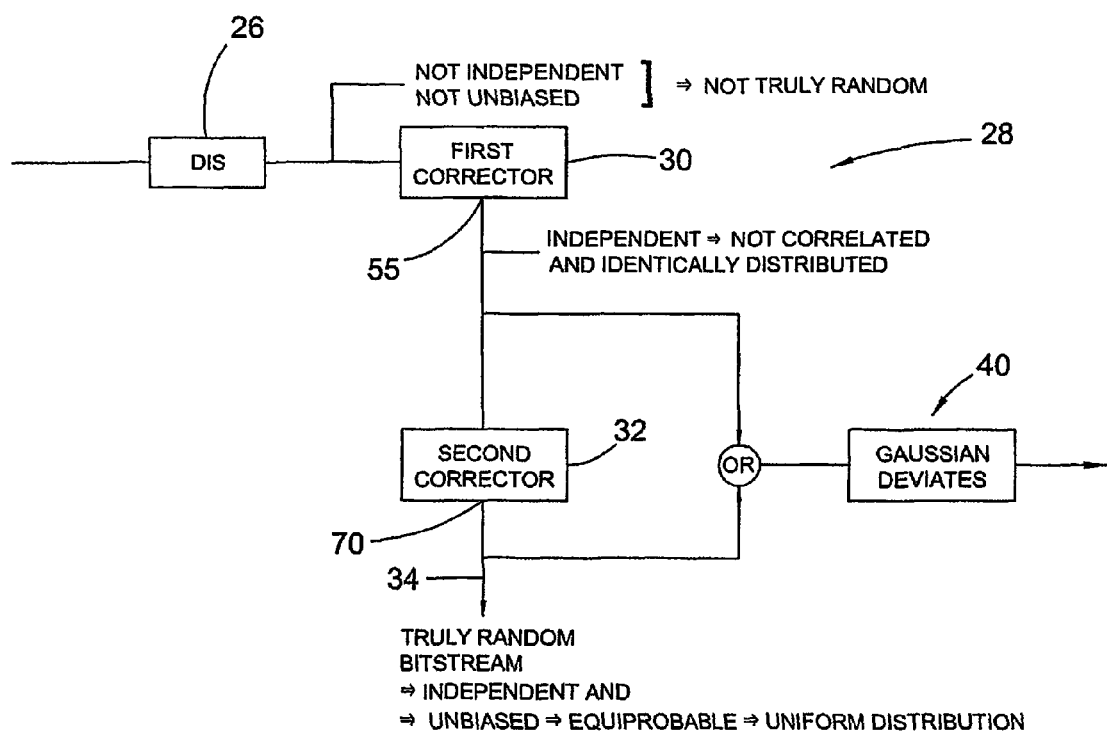

The invention will now further be described, by way of example only, with reference to the accompanying diagrams wherein:

FIG. 1 is a block diagram of a hardware random number generator (RNG) according to the invention;

FIGS. 2(a), 2(b) and 2(c) are waveforms against time of signals at points 2(a), 2(b) and 2(c) in FIG. 1;

FIG. 3 is a logic diagram of one embodiment of a first digital corrector circuit forming part of the RGN in FIG. 1;

FIGS. 4(a), 4(b), 4(c), 4(d), 4(e) and 4(f) are waveforms against time of signals at points 4(a), 4(b), 4(c), 4(d), 4(e) and 4(f) in FIG. 3;

FIG. 5 is a logic diagram of one embodiment of a second digital corrector circuit forming part of the RGN in FIG. 1;

FIGS. 6(a), 6(b), 6(c), 6(d), 6(e) and 6(f) are waveforms against time at points 6(a), 6(b), 6(c), 6(d), 6(e) and 6(f) in FIG. 5;

FIG. 7 is a logic diagram of the first and second digital correctors circuits connected in series; and FIGS. 8(a), 8(b), 8(c), 8(d), 8(e), 8(f), 8(g), 8(h), 8(i) and 8(j) are waveforms against time of signals at points 8(a), 8(b), 8(c), 8(d), 8(e), 8(f), 8(g), 8(h), 8(i) and 8(j) in FIG. 7; and FIG. 9 is a high level block diagram of the RNG according to the invention.

DESCRIPTION OF PREFERRED EMBODIMENTS OF THE INVENTION

A hardware random number generator (RNG) according to the invention is generally designated by the reference numeral 10 in FIG. 1.

The RNG 10 comprises a source of entropy 12 generating a wide bandwidth analogue output signal 14. The source of entropy may comprise a thermal noise element such as a semiconductor junction, resistor or an avalanche noise generator for generating random or white noise. The element is connected to a high pass amplifier 16 having a cut off frequency $f_0$ and providing an amplified output signal 18.

The amplifier is connected to an analogue control circuit 20 for controlling a discrimination level for a known inverting discriminator 22. At an output of the discriminator there is provided an analogue signal having an average frequency <f>. The circuit 20 comprises an RC feedback loop 23 to control and correct for temperature and power supply variations which may influence the element 12 and amplifier 22.

The output of the discriminator is connected to flip-flop 24 to yield a digital bit stream 26 shown in FIG. 2(a). The RC time constant of the circuit 23 is slower than $1/f_0$. In this manner substantially equal numbers of bits of a first state and bits of a second state are generated at the output of the flip-flop. Hence, the bit stream 26 in FIG. 2(a) comprises a sequence of successive bits having one of the first state and the second state. The states may be a logic high or "1" and a logic low or "0". As illustrated in FIG. 9, it is known that these bits are typically not independent from one another nor unbiased. Therefore, the bit stream 26 is not truly random. As will hereinafter be described, a hardware digital corrector arrangement 28 comprising a first digital corrector circuit 30 (shown in FIGS. 3, 7 and 9) and a serially connected second digital corrector circuit 32 (shown in FIGS. 5, 7 and 9), is used to remove correlation between bits and bias respectively, thereby to provide a truly random bit stream 34. The RNG further comprises a clock generator 36 for generating a dock signal 38 shown in FIG. 2(b). The RNG 10 further comprises a hardware Gaussian generator 40 which receives the truly random bit stream 34 as an input and generates words with standard Gaussian deviates, mean zero and variance 1, as will hereinafter be described. An output of the generator 40 is connectable to an input of any suitable application 42.

The frequency of the clock signal 38 is typically lower than the average or means frequency of the digital input stream (DIS) 26. In other embodiments a DIS 44 with a lower average frequency than the clock signal may be used. The DIS 26 or 44 is provided as one input to the first digital corrector circuit 30. The other input being the clock signal 38.

The first digital corrector circuit 30 is a circuit for removing inter bit dependence in the DIS 26 or 44 comprising successive bits $S_1, S_2, S_3, \ldots S_n$. It has been found that a circuit implementing a first scheme according to the following first truth table in respect of two immediately successive bits in the stream 26 or 44 (wherein the first bit is leading the second bit in time) and having one of a first state p and a second state q, would achieve this result:

| | |
|---|---|
| $1^{st}$bit, $2^{nd}$bit→p,p→c | (third state) |
| $1^{st}$bit, $2^{nd}$bit→p,q→c' | (fourth state) |
| any other—no output | | with c and c' being the inverse of the other, and c equal to p or q.

In this first scheme, successive pairs of immediately adjacent bits in stream 26 or 44 are used and no two bits are used more than once.

In one embodiment of the invention, the aforementioned first scheme is implemented by circuit 30 shown in FIG. 3 and comprising a first flip-flop 45, a second flip-flop 47 and a third flip-flop 49 as shown in FIG. 3. The circuit 30 has a first input 51, a second input 53, a first output 55 and a first clock output 57. Referring to FIGS. 3 and 4(a) to 4(f), the bit stream 26 is applied to the first input 51 and the clock signal 38 to second input 53. The sequence 44 shown in FIG. 4(a) appears at the output of flip-flop 45 and at the output of flip-flop 47, one clock cycle later, as indicated at 50 in FIG. 4(c). A clock signal divided by two is provided at a Q-output of flip-flop 49 and is illustrated at 52 in FIG. 4(d). The comparison between signals 44 and 50 according to the first truth table is made on the rising edges of signal 52. An output bit stream 56 is generated by the first scheme and in accordance with the aforementioned first truth table at first output 55 of the circuit 30 and is designated 56 in FIG. 4(f). At the first clock output 57 of the circuit 30, an output clock signal 54 comprising intermittent and not periodic pulses 58.1 to 58.n is generated, successive pulses being associated with and synchronized with successive bits $t_1, t_2, t_3 \ldots t_m$ in the output bit stream 56 of the first corrector circuit. These output bits are substantially independent of one another in that correlation is removed by the first corrector.

In embodiments wherein the clock frequency is higher than the frequency of the DIS 44, the DIS 44 may be used to latch the clock signal. That is, the signals at inputs 51 and 53 are changed around.

The RNG 10 comprises a second digital corrector circuit 32 for correcting bias of aforementioned bits $t_1, t_2, t_3 \ldots t_m$. The second corrector circuit 32 is connected in series with the first corrector circuit 30 as shown in FIG. 7. The first output 55 of the first circuit 30 is connected to a first input 60 of the second corrector circuit and the first clock output 57 of the first corrector circuit is connected to a second input 62 of the second circuit 32. To illustrate the operation of the second circuit, the second circuit is shown on its own in FIG. 5.

It has been found that a circuit 32 implementing a second scheme according to a second truth table ( shown herebelow) in respect of two immediately successive bits in a DIS 26 or 44 having one of a first state p and a second state q, would substantially remove bias of the bits in the DIS:

$1^{st}$bit, $2^{nd}$bit→p,q→c     (third state)

$1^{st}$bit, $2^{nd}$bit→q,p→c'    (fourth state)

any other—no output with c and c' being the inverse of the other, and c equal to p or q.

Figure 6:
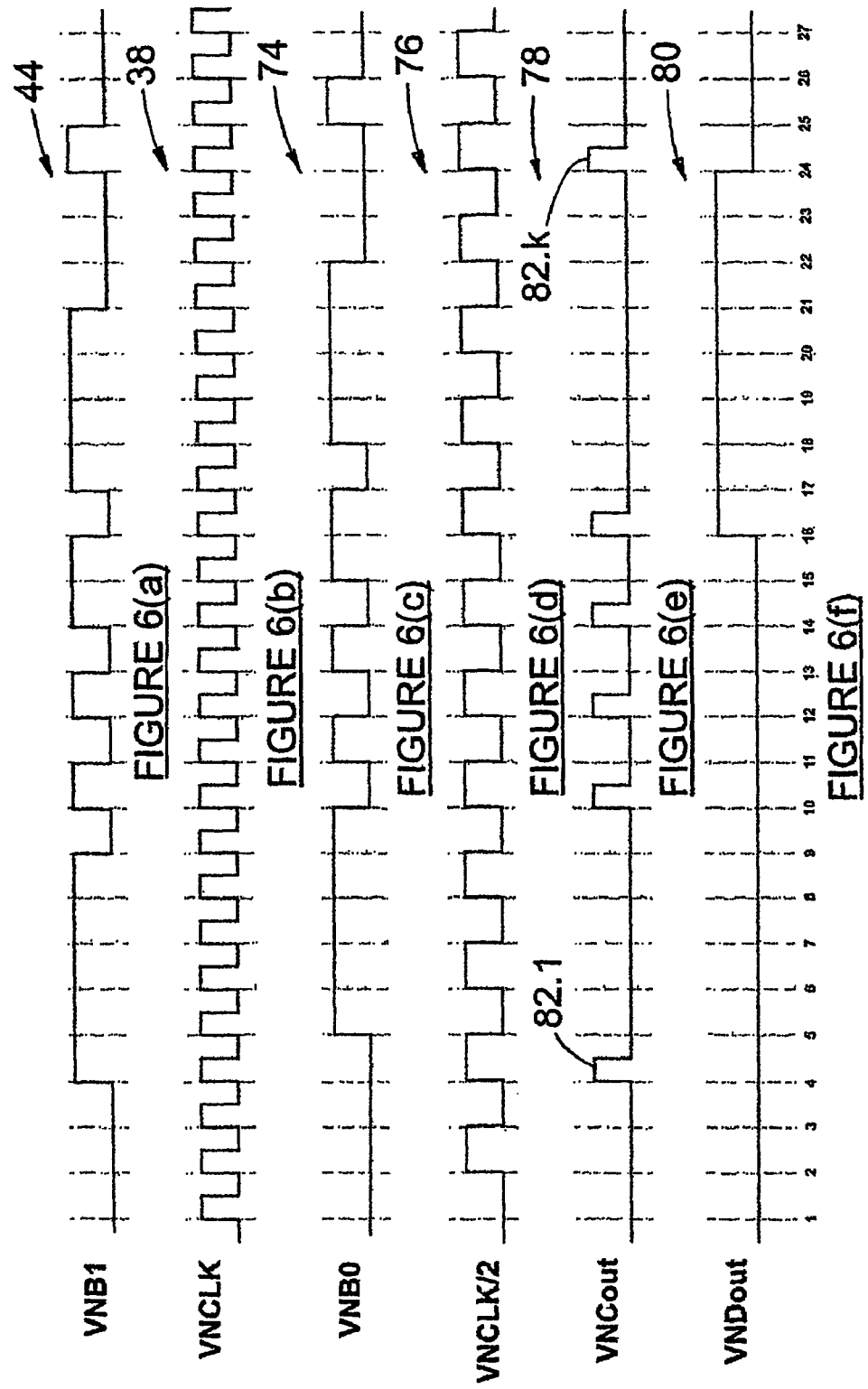

In one embodiment of the invention, the aforementioned second scheme is implemented by circuit 32 shown in FIG. 5 and comprising a first flip-flop 64, a second flip-flop 66 and a third flip-flop 68. Apart from the aforementioned first and second inputs 60,62 the circuit 32 has a first output 70 (or a second for the arrangement 28) and a second clock output 72. Referring to FIGS. 5 and 6(a) to 6(f), the bit stream 44 (which for this illustration is the same as that applied to the first corrector hereinbefore) is applied to the first input 60 and the clock signal 38 to second input 62. The sequence 44 appears at the output of flip-flop 66 one clock cycle later than at the Q-output of flip-flop 64 and is designated 74 in FIG. 6(c). A clock signal divided by two is provided at a Q-output of flipflop 68 and is illustrated at 76 in FIG. 6(d). An output bit stream 80 is generated by the circuit 32 in accordance with the second scheme and the aforementioned second truth table at output 70 and is shown in FIG. 6(f). At the second clock output 72 an output clock signal 78 comprising intermittent and not periodic pulses 82.1 to 82.k is generated, successive pulses being associated with coincides with successive bits $l_1$, $l_2$, $i_3$ ... $l_k$ in the output bit stream 80 of the second corrector circuit. Bias of bits in the output stream 80 is substantially removed.

As shown in FIGS. 7 and 9 the first and second corrector circuits are connected in series, to remove both correlation between bits and bias respectively and thereby to yield a truly random bit stream 34 in which the bits are independent, unbiased and hence equi-probable or uniformly distributed.

Waveforms for this serial connection of circuits 30 and 32 are shown in FIGS. 8(a) to 8(j). Since the input bit stream 44 is the same as that used in the description of FIG. 3, FIGS. 8(a) to 8(f) correspond with the waveforms in FIGS. 4(a) to 4(f). However, with the serial connection of circuits 30 and 32 the output signals 54 and 56 are connected to the inputs 60 and 62 respectively of the second corrector circuit 32. The resulting signals at the Q-outputs of the flip-flops 64 and 66 are shown at 56 and 84 in FIGS. 8(f) and 8(g). The clock signal divided by two generated at the Q output of flip-flop 68 is shown at 86 in FIG. 8(h). The output bit stream of the corrector arrangement 28 is shown at 34 in FIG. 8(j). A clock signal to indicate successive bits in the output bit stream 34 is illustrated 88 in FIG. 8(i).

As shown in FIG. 9, a hardware Gaussian generator 40 is connected to either output 55 or output 70 of the digital corrector arrangement 28.

According to the central limit theorem in statistics, by summing by means of a suitable hardware adder or summing arrangement sufficient random words j results in a sum T which approaches that of a Gaussian deviate with known mean <T> and known standard deviation $S_N$. The generator 40 is configured to sum j words of i bits in the stream 34 each.

The generator is further configured intermittently to compute sums T as aforesaid, to subtract by a suitable hardware arrangement an average <T> of the sums and to divide the difference by a standard deviation $S_N$ utilizing a suitable hardware divider arrangement, to yield Gaussian deviates Z with a zero mean and unity standard deviation.

It is believed that the RGN 10 herein described may be implemented in the form of an integrated chip and housed in a plug-and-play device, comprising a USB memory stick. Once the device is activated, the generator 40 starts adding words until a default number or user specified number is reached, which would result in a Gaussian deviate as hereinbefore described and which would be available for input by the application 42.

The invention claimed is:

1. A hardware random number generator (RNG), comprising:
   a source of entropy to provide an input bit stream comprising successive bits of a first state and a second state;
   a first digital corrector comprising a first input and a first output;
   the corrector being configured to provide at the first output from two successive bits in the input bit stream an output bit of a first output bit stream according to a first scheme wherein a first bit of a first state (p) and a second bit of the first state (p) yield an output bit of a third state (c) and wherein a first bit of the first state (p) and a second bit of a second state (q) yield an output bit of a fourth state (c'), wherein the third and fourth states are inverse to one another and wherein the third state is equal to one of the first state and the second state, wherein a first bit of the second state (q) and a second bit of the first state (p) yield no output bit and wherein a first bit of the second state (q) and a second bit of the second state (q) yield no output bit.

2. An RNG as claimed in claim 1 wherein the first output of the first corrector is connected to a first input of a second digital corrector, the second digital corrector comprising a first output and being configured to provide at the first output from two successive bits at the first input of the second corrector an output bit of a second output bit stream according to a second scheme wherein a first bit of a first state (p) and a second bit of a second state (q) yield an output bit of a third state (c) and wherein a first bit of the second state (q) and a second bit of the first state (p) yield an output bit of a fourth state (c'), wherein the third and fourth states are inverse to one another and wherein the third state is equal to one of the first state and the second state, where a first bit of the first state (p) and a second bit of the first state (p) yield no output bit in the second output bit stream and wherein a first bit of the second state (q) and a second bit of the second state (q) yield no output bit in the second output bit stream, thereby to ensure that successive bits in the second output bit stream are both independent from one another and unbiased.

3. An RNG as claimed in claim 1 wherein the source of entropy comprises a white noise generating element having an output connected to an input of an analogue high pass amplifier having an output and a cut off frequency of $f_0$.

4. An RNG as claimed in claim 3 wherein the output of the high pass filter is connected to an input of a voltage level discriminator circuit having an output.

5. An RNG as claimed in claim 4 wherein the output of the level discriminator circuit is connected to a first input of a flip-flop, to generate the input bit stream at an output thereof.

6. An RNG as claimed in claim 4 wherein an analogue voltage level compensation circuit is provided at the input of the voltage level discriminator circuit.

7. An RNG as claimed in claim 6 wherein the compensation circuit comprises an RC circuit having an RC time constant which is shorter than $1/f_0$.

8. An RNG as claimed in claim 1 comprising a Gaussian generator comprising an input connected to the first output of the first digital corrector, the generator comprising an adder arrangement for generating a sum of j words of i sequential bits each received from the corrector arrangement; a subtractor arrangement for deriving a difference between the sum and a mean value of the sum;

and a divider arrangement for dividing the difference by a standard deviation, thereby to generate at an output of the Gaussian generator a Gaussian deviate.

9. An RNG as claimed in claim 1 wherein the input bit stream is derived from a signal derived from the source of entropy latched by a clock signal, or from a clock signal latched by a signal derived from the source of entropy.

10. A method of generating random bit stream comprising the steps of:

utilizing a source of entropy for providing an input bit stream comprising successive bits of a first state and a second state;

utilizing a first hardware digital corrector comprising a first input and a first output to provide at the first output from two successive bits in the input bit stream an output bit of a first output bit stream according to a first scheme wherein a first bit of a first state (p) and a second bit of the first state (p) yield an output bit of a third state (c) and wherein a first bit of the first state (p) and a second bit of a second state (q) yield an output bit of a fourth state (c'), wherein the third and fourth states are inverse to one another and wherein the third state is equal to one of the first state and the second state, wherein a first bit of the second state (q) and a second bit of the first state (p) yield no output bit and wherein a first bit of the second state (q) and a second bit of the second state (q) yield no output bit.

11. A method as claimed in claim 10 wherein a second digital corrector comprising an input and an output is utilized in series with the first corrector, wherein the second corrector is used to provide at the first output from two successive bits at the first input of the second corrector an output bit of a second output bit stream according to a second scheme wherein a first bit of a first state (p) and a second bit of a second state (q) yield an output bit of a third state (c) and wherein a first bit of the second state (q) and a second bit of the first state (p) yield an output bit of a fourth state (c'), wherein the third and fourth states are inverse to one another and wherein the third state is equal to one of the first state and the second state, wherein a first bit of the first state (p) and a second bit of the first state (p) yield no output bit in the second output bit stream and wherein a first bit of the second state (q) and a second bit of the second state (q) yield no output bit in the second output bit stream, thereby to ensure that successive bits in the second output bit stream are both independent from one another and unbiased.

* * * * *

UNITED STATES PATENT AND TRADEMARK OFFICE
CERTIFICATE OF CORRECTION

| | |
|---|---|
| PATENT NO. | : 7,810,011 B2 |
| APPLICATION NO. | : 10/569292 |
| DATED | : October 5, 2010 |
| INVENTOR(S) | : Ocker C. de Jager et al. |

Page 1 of 1

It is certified that error appears in the above-identified patent and that said Letters Patent is hereby corrected as shown below:

In column 1, line 8, delete "Aug," and insert -- Aug. --, therefor.

In column 1, line 27, after "implement" insert -- . --.

In column 5, line 30, delete "flipflop" and insert -- flip-flop --, therefor.

In column 5, line 37, delete "$i_3$" and insert -- $I_3$ --, therefor.

In column 7, line 18, in Claim 10, after "generating" insert -- a --.

Signed and Sealed this

Thirtieth Day of November, 2010

David J. Kappos
*Director of the United States Patent and Trademark Office*